US010813038B2

(12) United States Patent
Augustyniak et al.

(10) Patent No.: US 10,813,038 B2
(45) Date of Patent: Oct. 20, 2020

(54) CELL-BLOCKING METHODS AND APPARATUS IN CELLULAR COMMUNICATIONS NETWORKS

(71) Applicant: ORANGE, Paris (FR)

(72) Inventors: Marcin Augustyniak, Warsaw (PL); Dariusz Kowalski, Warsaw (PL); Jan Kienig, Warsaw (PL)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/626,737

(22) PCT Filed: Jun. 25, 2018

(86) PCT No.: PCT/IB2018/000948
§ 371 (c)(1),
(2) Date: Dec. 26, 2019

(87) PCT Pub. No.: WO2019/002950
PCT Pub. Date: Jan. 3, 2019

(65) Prior Publication Data
US 2020/0120577 A1  Apr. 16, 2020

(30) Foreign Application Priority Data
Jun. 29, 2017 (EP) .................... 17305815

(51) Int. Cl.
*H04W 36/00* (2009.01)
*H04W 48/02* (2009.01)
(Continued)

(52) U.S. Cl.
CPC ....... *H04W 48/02* (2013.01); *H04W 12/1204* (2019.01); *H04W 36/0079* (2018.08); *H04W 68/005* (2013.01); *H04W 76/30* (2018.02)

(58) Field of Classification Search
CPC . H04W 48/02; H04W 76/30; H04W 36/0079; H04W 12/1204; H04W 68/005; H04W 4/021
See application file for complete search history.

(56) References Cited

U.S. PATENT DOCUMENTS 8,768,311 B2 * 7/2014 Beadle .................. H04M 1/663
455/414.1
2011/0319125 A1 * 12/2011 Nakano ................. H04W 52/28
455/522

FOREIGN PATENT DOCUMENTS

EP        2134121 A1    12/2009

OTHER PUBLICATIONS

International Search Report dated Oct. 8, 2018 for corresponding International Application No. PCT/IB2018/000948, filed Jun. 25, 2018.
(Continued)

*Primary Examiner* — Marcos Batista
(74) *Attorney, Agent, or Firm* — David D. Brush; Westman, Champlin & Koehler, P.A.

(57) ABSTRACT

In a cellular communications network including user equipment and an access network, a cell-blocking method involves designating a cell in the network that is to be blocked and activating a cell-blocking operating mode of a node of the access network of the cellular communications network. According to the cell-blocking method, upon activation of the cell-blocking mode of the access-network node, active calls in the designated cell are detected and disconnected. The disconnection of active calls may be performed selectively based on an access class or establishment cause associated with the call. The cell-blocking may be hidden because the access-network node may not broadcast any data that is indicative of cell-blocking and, when a user equipment in the affected cell attempts to set-up a call, (Continued)

the access-network node may reject the call using an admission control mechanism or may send back a spoofed message from the core network.

19 Claims, 3 Drawing Sheets

(51) Int. Cl.
*H04W 76/30* (2018.01)
*H04W 12/12* (2009.01)
*H04W 68/00* (2009.01)

(56) References Cited

OTHER PUBLICATIONS

Written Opinion of the International Searching Authority dated Oct. 8, 2018 for corresponding International Application No. PCT/IB2018/000948, filed Jun. 25, 2018.

* cited by examiner

CELL-BLOCKING METHODS AND APPARATUS IN CELLULAR COMMUNICATIONS NETWORKS

CROSS-REFERENCE TO RELATED APPLICATIONS

This Application is a Section 371 National Stage Application of International Application No. PCT/IB2018/000948, filed Jun. 25, 2018, which is incorporated by reference in its entirety and published as WO 2019/002950 A1 on Jan. 3, 2019, not in English.

TECHNICAL FIELD

The present invention relates to the field of cellular communications networks and, in particular, to cell-blocking methods and cell-blocking apparatus in cellular communications networks.

RELATED ART

Operators of cellular communications networks may be asked by governmental agencies to block communications in particular cells of the network at a particular time, for example in order to disable mobile service in an area if it is feared that an explosive device located somewhere in that area may be detonated via reception of a call, or if it is desired to implement a temporary block on other dangerous communications.

Cellular communications networks include 2G networks such as GSM networks, 3G networks such as Universal Mobile Telecommunications System (UMTS), 4G networks such as Long Term Evolution (LTE) networks. Cell-blocking could be performed by use of cell-barring (or cell-reservation) mechanisms and access-restriction mechanisms that are specified in various of the technical standards relating to such cellular communications networks. For example, the 3$^{rd}$ Generation Partnership Project (3GPP) has specified cell-barring and cell-reservation mechanisms in section 5.3 of its standard 3GPP TS 36.304 applicable to the Evolved UMTS Terrestrial Radio Access (E-UTRA) portion of LTE networks.

According to section 5.3 of the 3GPP TS 36.304 standard, cell-barring/reservation is set up in the radio access network (RAN), i.e. on the access-network side, and is enforced by the behaviour of the user equipment (UE). The network side broadcasts System Information on the Physical Downlink Shared Channel including an item of information designated SystemInformationBlockType1. SystemInformationBlockType1 has three elements called: cellBarred, cell ReservedForOperatorUse and cell ReservationExtension. CellBarred can take values of "barred" or "not barred". CellReservedForOperatorUse can take values of "reserved" or "not reserved". CellReservationExtension can take values of "reserved" or "not reserved". To block communications in a specified cell in an LTE network, the network side could set to "barred" the value of cellBarred that is broadcast in relation to the specified cell, or set to "reserved" the value of cellReservationExtension that is broadcast in relation to the specified cell. UEs are designed to decode System Information messages as they carry information necessary for the UE to operate in the given radio network. If a UE receives SystemInformationBlockType1 on the Physical Downlink Shared Channel (PDSCH) containing cellBarred having the value "barred", or containing cellReservationExtension having the value "reserved" in respect of a specified cell, the UEs cannot select or re-select the specified cell but must select another cell.

Existing technical standards also specify some techniques for access control, i.e. techniques for controlling (and restricting) which user equipment is allowed to make attempts to access network resources at a given time. For example, the 3GPP TS 2.011 specification describes an access control technique in which signals are broadcast in the access-network to identify certain access classes as barred from making access attempts at a particular time (e.g. at a time of an emergency, or when one or more Public Land Mobile Networks (PMLNs) has failed, and so on). The UEs in the identified access classes recognize from the broadcast signals that they are not allowed to make attempts to access network resources and are configured to comply with the access restriction.

There are a number of disadvantages associated with implementing cell-blocking using the known cell-barring, cell-reservation and access restriction mechanisms. For example, in the known cell-barring, cell-reservation and access restriction mechanisms a data element associated with the cell-barring, cell-reservation or access restriction is broadcast over the access network, and so it is easily detectable that these mechanisms are in operation. So, if these mechanisms are used to implement cell-blocking a targeted malicious person might be able to deduce that communications are being blocked in the cell used by their UE.

As another example, when the known cell-barring or cell-reservation mechanisms are implemented, UEs in the cell do not select or re-select the affected cell but calls-in-progress may continue and handovers into the cell may still take place. Likewise, when the known access restriction techniques are in operation, UEs in an affected cell do not make new access attempts but they may remain involved in calls-in-progress and handovers into the cell. Thus, known cell-barring, cell-reservation and access-restriction mechanisms do not allow full blocking of communications in a target cell.

As yet another example, the known cell-barring and cell-reservation mechanisms may prevent users of UEs from making emergency calls. However, it may be desirable to allow emergency calls to be made even when it is desired to block other communications in the cell.

The present invention has been made in the light of the above problems.

SUMMARY OF THE INVENTION

Certain embodiments of the invention provide a cell-blocking method in a cellular communications network comprising user equipment, an access network and a core network, the method comprising:

designating a cell in the network for blocking;

activating a cell-blocking operating mode of a node of the access network of the cellular communications network, the access-network node operating to block communications in the designated cell when the access-network node operates in the cell-blocking mode; and detecting, by the access-network node, upon activation of the cell-blocking mode of the access-network node, active calls in the designated cell; and disconnecting, by the access-network node, at least one active call among active calls detected by the detecting.

In the above cell-blocking method the communications in the cell can be blocked by action taken on the access-network side, without a requirement for action on the UE side. Accordingly, there is no requirement for broadcasting a specific signal or data-item towards the UEs as part of the cell-blocking process. In the case where there is no broadcast of a specific signal associated with the cell-blocking process it may not be apparent to UEs that cell-blocking is in progress. So, this cell-blocking method may be called a "hidden cell-blocking method".

In certain implementations of the above cell-blocking method the access-network selectively disconnects one or more active calls that are active at the time of activating cell-blocking, dependent on the access class or establishment cause of the call. In this way, active emergency calls need not be disconnected even though other active calls in the cell are discontinued.

In the above cell-blocking method the access-network nodes may, while operating in cell-blocking mode, block at least one incoming call (e.g. mobile-terminated calls) that are directed to user equipment in the designated cell. Once again, this function may be implemented selectively dependent on the access class or establishment cause associated with the at least one incoming call. Accordingly selected types of call, e.g. emergency calls, may be permitted in the blocked cell while other communications may be blocked. In such an implementation of the cell-blocking method, incoming calls to UEs in a designated cell may be blocked in various ways including, as an example, by the access-network node(s) of the designated cell omitting to broadcast paging messages to the UE being called. This approach contributes to the hidden nature of the cell blocking process.

In certain embodiments of the invention, upon activation of the cell-blocking operation mode, an access-network node may detect handovers that are in progress to handover calls into the designated cell, and may terminate detected handovers. An advantage of this approach is that it increases the completeness of the blocking of communications in the targeted cell. The access-network node may be configured to terminate one or more of the detected handovers selectively dependent on the access class or establishment cause associated with the call involved in the handover. This approach enables selected types of calls to be continued even when other communications are being blocked.

In certain embodiments of the invention, an access-network node operating in cell-blocking which receives an outgoing call set-up request from user equipment in the designated cell may block on or more of the outgoing calls. This blocking of one or more of the outgoing calls may be implemented selectively dependent on the access class or establishment cause associated with the outgoing call. This approach enables emergency calls, or other selected types of call, to be made by UEs in the blocked cell, even though other communications cannot be set up.

Embodiments of the invention may use different techniques to block outgoing calls. One technique involves an access-node transmitting a spoofed core network message to the user equipment. Another technique involves an access-network node rejecting the call using an admission control mechanism in the access network. According to the latter two techniques, the UE that is attempting to make a call receives back from the network messages that are consistent with usual (i.e. non-blocked) operation of the network. Thus these techniques contribute to the "hidden" nature of the cell blocking.

The present invention further provides cell-blocking apparatus in a cellular communications network comprising user equipment, an access network and a core network, the cell-blocking apparatus comprising:

access-network nodes configured to be operable in a cell-blocking mode to block communications in cells of the communications network;

an input unit to receive a designation of a cell in the network to be blocked;

an activation unit to activate a cell-blocking operating mode of an access-network node serving the designated cell;

a detection unit, in the access-network node, to detect calls that are active in the designated cell upon activation of the cell-blocking mode of the access-network node; and a control unit, in the access-network node, to disconnect at least one active call among the active calls detected by the detection unit.

The above-described cell-blocking method and apparatus may be applied in general in any cellular communications network. For example, in an LTE network the method and apparatus may be implemented using eNodeBs as the access-network nodes that are activated to operate in cell blocking mode. As another example, in a 2G or 3G network the method and apparatus may be implemented using NodeBs and/or Radio Network Controllers as the access-network nodes that are activated to operate in cell blocking mode. Embodiments of the above-described cell-blocking method and apparatus implement cell-blocking functionality by operation of a node of the access network (rather than by an element in the core network), and this has the advantage that the cell-blocking can be performed individually for a chosen cell covering a limited area (instead of for the whole of an operator's network).

In the above-described cell-blocking method and apparatus the cell-blocking operating mode of an access-network node may be activated in various ways. One approach makes use of an operation and management system of the communications network. According to such an approach system components that are already present in the network are exploited in order to implement the new cell-blocking technique.

BRIEF DESCRIPTION OF THE DRAWINGS

Further features and advantages of embodiments of the present invention will become apparent from the following description of said embodiments, which is given by way of illustration and not limitation, illustrated by the accompanying drawings, in which.

DETAILED DESCRIPTION OF ILLUSTRATIVE EMBODIMENTS

Before describing methods and apparatus according to certain embodiments of the invention, a brief description will first be given of a cellular communications network in which embodiments of the invention may be implemented.

Figure 1:
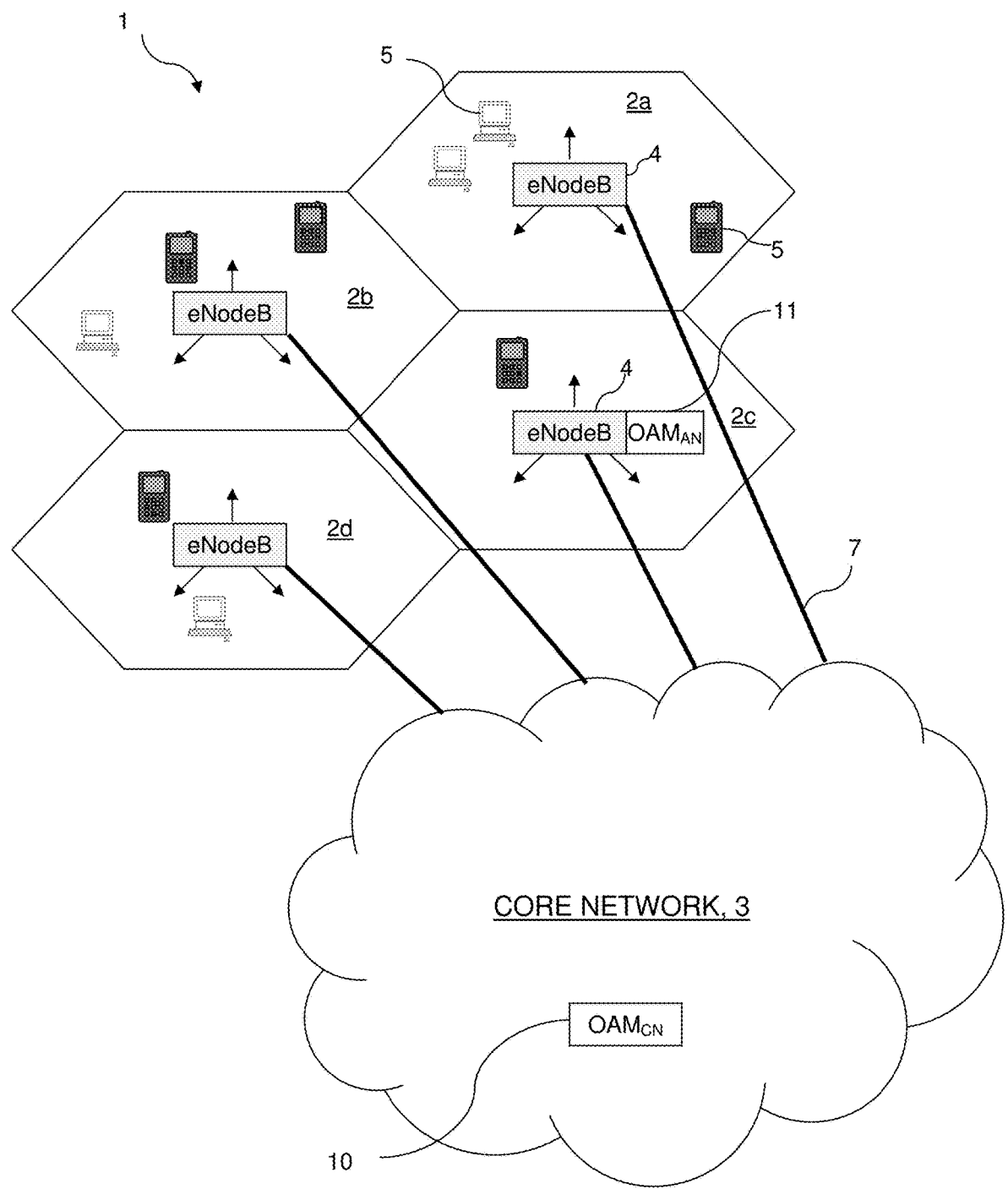
FIG. 1 is a schematic diagram illustrating components in an example of a cellular communications network in which the cell-blocking method of the invention may be applied.

FIG. 1 illustrates, in simplified form, certain components in an example of a suitable cellular communications network. The example of FIG. 1 relates to an LTE network but it is to be understood that the invention is applicable more widely in cellular communications networks according to different standards including, but not limited to 2G, 3G and 4G networks.

As illustrated in FIG. 1, a cellular communications network 1 defines a number of cells 2 in which user equipment may take part in communications. Four cells are illustrated in FIG. 1 and are labelled 2a, 2b, 2c and 2d, respectively. Calls made by user equipment in the cells 2 are connected to a called party via an access network connected to a core network 3. The example of FIG. 1 relates to an LTE network in which the access network is a radio access network (e-UTRAN) having eNodeBs 4 serving the cells 2. Different types of user equipment 5 may communicate using the network 1, including mobile telephones, laptop computers having mobile broadband adaptors, and so on.

In the case of an LTE network as illustrated in FIG. 1, the core network 3 may comprise an evolved packet core (EPC) and there are links 7 between the eNodeBs and gateways in the EPC (S1 links). In addition there are X2 links (not shown) interconnecting neighbouring eNodeBs. The communications network 1 may include an Operations and Management (OAM) system and, as illustrated in FIG. 1, the core network 3 may implement certain elements 10 of the OAM system and the nodes of the access-network may implement other elements 11 of the OAM system. To simplify the diagram, FIG. 1 shows only one access-network-side OAM unit 11 associated with the eNodeB of cell 2c but, in practice, each of the eNodeBs may have a respective module 11 implementing OAM functionality.

Typically, in embodiments of the invention, it is in response to a request made by police or security services that the network operator activates blocking of communications in a set of one or more cells. Therefore, generally, the triggering of activation of the cell-blocking operating mode is performed manually for a specified set of cells. However, an automated triggering system is not precluded. A convenient approach to use for activation of the cell-blocking operating mode of an access-network node is to exploit OAM system elements already present in the communications network. OAM systems have not been standardized and so the specifics of their implementation can vary. In some cases the OAM may comprise a web interface (www) or a command line (ssh) and the network operator can use these to activate the cell-blocking operating mode of a selected access-network node. In other cases an activation signal or message may be transmitted to the relevant access-network node using an element management system of the communication network. Typically, OAM elements may be configured to implement embodiments of the invention by suitable configuring of OAM firmware.

In some embodiments of the invention, various aspects of the cell-blocking functionality may be configurable.

Configurable aspects of the cell-blocking functionality may include one or more items in the following list:
- cell list: a list of all the cells where the cell-blocking operating mode is to be implemented;
- affected access classes: a list of access classes covered by (or excluded from) cell-blocking;
- affected establishment causes: a list of call-establishment causes covered by (or excluded from) the cell-blocking;
- UE-Originated Call blocking enabled or disabled (there may be use cases where only incoming calls to UEs in a targeted cell are to be blocked and the UEs in the cell may still make outgoing calls);
- paging broadcasts enabled or disabled;
- handovers prohibited/disconnected;
- broadcasting enabled or/disabled: i.e. is information to be broadcast by the access-network node regarding the fact that cell-blocking is in progress.

Below further information will be given regarding the configurable parameters listed above.

In the case where aspects of the cell-blocking functionality are configurable, the applicable settings of the configurable parameters can be specified in various ways. In some cases the network operator may specify the particular setting of the configurable parameters to be used for a given instance of cell-blocking, and the settings may be communicated to the access-network node at the time when the cell-blocking operating mode of the access-network node is activated. In certain cases the access-network node may set the values of the configurable parameters, for example by look-up in a table of predetermined settings. A hybrid approach may be used in which some configurable parameters are determined by the network operator and others are determined by the access-network node.

An example cell-blocking method according to an embodiment of the invention will now be described with reference to the flow diagram of FIG. 2.

Figure 2:
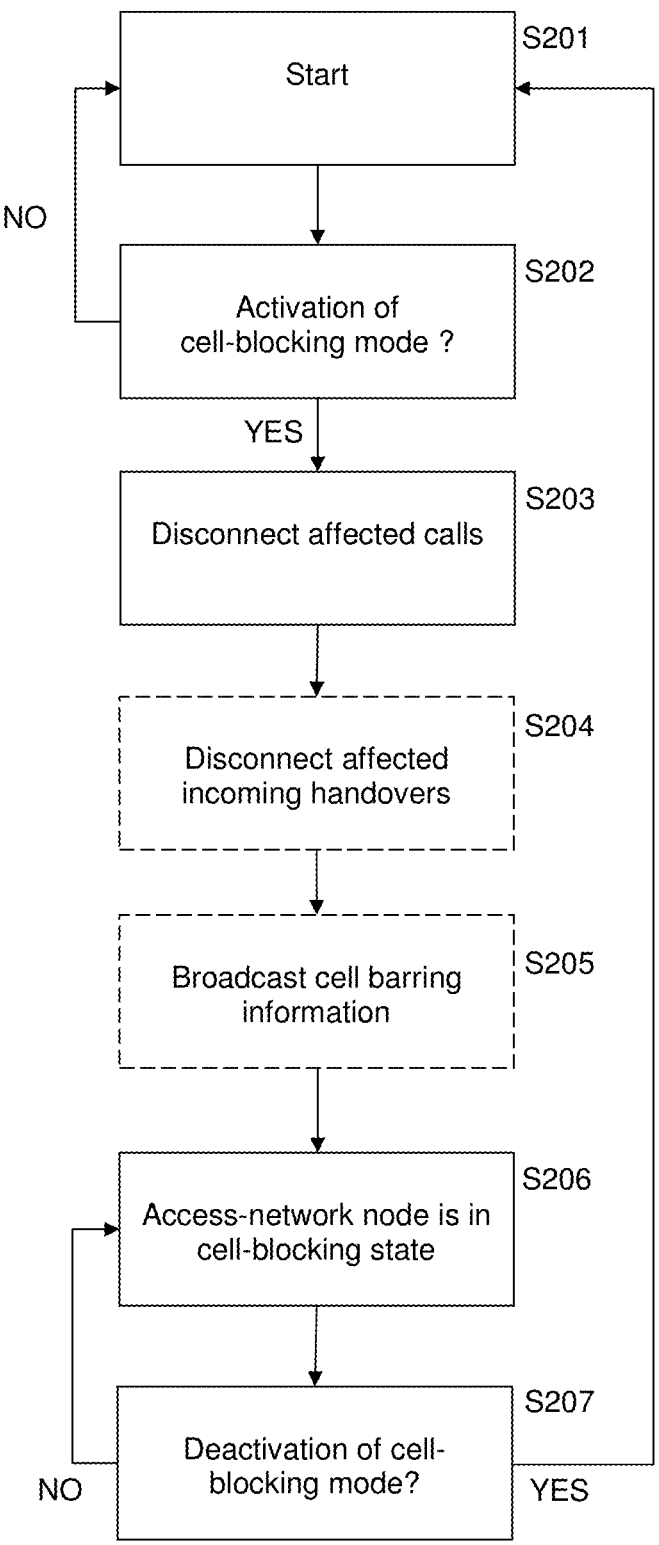
FIG. 2 is a flow diagram illustrating a process including implementation of a cell-blocking method according to an embodiment of the invention.

According to an example implementation in an LTE network, the method of FIG. 2 is implemented by appropriately-configured eNodeBs, such as the eNodeBs 4 in FIG. 1, but it is to be understood that other types of access-network node may implement the method of FIG. 2. For example, in a UMTS network the method of FIG. 2 may be implemented in appropriately-configured NodeBs, or may be implemented in appropriately-configured radio network controllers (in which case the RNC may implement cell-blocking for a selected cell, or for plural cells at the same time).

Typically an access-network node may be configured to implement embodiments of the invention suitable configuring of the firmware of the node.

In the method illustrated by FIG. 2, the access-network node starts operation (S201) and, in this example implementation, repeatedly checks (e.g. periodically, intermittently, etc.) whether a cell-blocking operating mode according to an embodiment of the invention has been activated (S202). If the cell-blocking operating mode has been activated, then the flow advances to S203. If the cell-blocking operating mode has not been activated then the flow loops back to S201 and another check S202 is made at a later time. It is not essential for the method to include repeated checks on whether or not the cell-blocking operating mode has been activated; a more passive approach may be adopted in which the access-network node simply awaits activation (e.g. in the form of reception of a message or signal, or by direct configuring of the access-network node via an interface or command line) and proceeds to S203 upon occurrence of activation.

When the access-network node is activated, if aspects of its cell-blocking functionality are configurable, the access-network node determines what are the settings of the configurable parameters. For example, settings of the configurable parameters may be communicated to the access-network node as part of the process of activating its cell-blocking operating mode. As another example, the access-network node may access settings stored (locally or remotely) in a memory or register.

Upon detecting activation of its cell-blocking operating mode, the access-network node disconnects calls that are active in the targeted cell (S203). The invention is not particularly limited having regard to the manner in which disconnection is achieved. According to some embodiments of the invention applied in UMTS or LTE networks, the access-network node disconnects affected active calls by transmitting an Iu Release Request (in an UMTS network) or RRC Connection Release message (in an LTE network) to the UE that is involved in the call and present in the targeted cell. The disconnection of the call may appear to the user of the UE as if an error has occurred in the network, e.g. a failure in a handover.

The access-network node may disconnect all active calls that are in progress involving an UE in the targeted cell when the cell-blocking operating mode is activated. However, the access-network node may be arranged to disconnect active calls selectively, based on the access class associated with the active call or on the establishment cause of the active call. As noted above, the access classes to be affected by cell-blocking may be a configurable parameter. This parameter may be set in various ways, for example, it may be set individually for each occasion when cell-blocking is implemented, set individually for different cells or types of cell (for all occasions when the relevant cell is blocked), and so on.

In 3G and 4G, networks UEs are members of one out of ten randomly allocated Access Classes (AC) 0 to 9, and higher numbered access classes are assigned, as follows: AC 11 is for PLMN use, AC 12 is for use by the security services, AC 13 is for use by public utilities (e.g. electricity and water suppliers), AC 14 is for use by emergency services and AC 15 is for use by PLMN staff. The applicable access class out of AC 0-9, and 11-15 is recorded in the SIM of the UE. Access class 10 is assigned for emergency calls.

In UMTS and LTE networks, radio resources in the access network are assigned for each call and a radio resource control (RRC) protocol is implemented. According to the RRC protocol each call is associated with an "establishment cause".

Nodes in the access network may not know the access class that is associated with a particular active call that is detected when the cell-blocking operating mode becomes activated. However, the establishment cause associated with the active call is known to the access network and this may, in turn, be related to an access class—for example, an establishment cause that is indicative of a high-priority call implies that the associated access class is one of AC 11-AC 15.

In cases where the access-network node, upon activation of its cell-blocking operating mode, is arranged to disconnect calls selectively based on the applicable access class/ establishment cause, this enables different cell-blocking attributes to be exhibited for different kinds of call, e.g. normal calls, emergency calls and calls in special classes.

Optionally, the access-network node may be arranged to immediately disconnect handovers that are in progress when the cell-blocking operating mode becomes activated (S204). Once again, the access-network node may be arranged to apply this prohibition/disconnection selectively based on the access class or establishment cause associated with the call being handed over.

As noted above, whether or not handovers are to be disconnected/prohibited upon activation of cell-blocking mode can be a configurable parameter of the cell-blocking functionality and, as for the "access class" parameter mentioned above, this handover disconnected/prohibited parameter may be set in various ways.

Optionally, the access-network node may be arranged to broadcast cell barring information (S205). In usual Cell Barring processes specified in technical standards, information about cell barring and its parameters is broadcasted and, normally, this will cause UEs to search for another cell. However, the cell-blocking functionality of the invention can advantageously be implemented without broadcast of cell-barring information and, in such a case, the fact that cell-blocking is in operation is concealed. This will cause UEs to believe that cell targeted by the cell-blocking is operating normally, so the UEs are not forced to search for another cell and will tend to remain camped on the existing, now-blocked cell.

It may be wished to broadcast cell-barring information, for example, in a case where cell-blocking is only implemented selectively for certain UE access classes. The cell-barring information may be broadcast throughout the time when the access-network node is in the cell-blocking mode of operation.

As noted above, whether or not cell-barring information is broadcast can be a configurable parameter of the cell-blocking functionality and, as for the "access class" parameter mentioned above, this cell-barring broadcast configurable parameter may be set in various ways.

When the access-network node has disconnected active calls (S203) and, optionally, disconnected/prohibited handovers (S204) and/or broadcast cell-barring information (S205), the access-network node enters a state in which it operates in a cell-blocking mode in an ongoing fashion (S206). It may be considered that the targeted cell is in a "hidden" blocked state.

In the example illustrated in FIG. 2, while the access-network node is operating in the cell-blocking mode, it repeatedly checks (e.g. periodically, intermittently, etc.) whether the cell-blocking operating mode has been deactivated (S207). If the cell-blocking operating mode has been deactivated, then the flow returns to S201 and the formerly-blocked cell ceases being in a hidden blocked state. If the cell-blocking operating mode has not been deactivated then the flow loops back to S206, the access-network node remains in the cell-blocking operating state and another check S207 is made at a later time. It is not essential for the method to include repeated checks on whether or not the cell-blocking operating mode has been deactivated; a more passive approach may be adopted (as in the case for activation).

While operating in cell-blocking mode (S206), the access-network node may perform various functions to prevent or restrict communications in the targeted cell. For example, while the access-network node is in the cell-blocking state, it may block UE-originating calls (i.e. outgoing calls from the targeted cell). As mentioned above the blocking of UE-originating calls from the cell may be a configurable parameter that is enabled, or disabled (e.g. because it is wished to block only incoming calls). The blocking of UE-originating calls may be performed selectively dependent on the access class or establishment cause for the outgoing call. The selectivity of the blocking of UE-originating calls may be a configurable parameter that is enabled, or disabled, allowing different degrees of cell-blocking to be implemented in accordance with the circumstances.

In a case where UE-originating calls are blocked selectively based on access class/establishment cause, UE-originating calls that are in permitted (unblocked) access classes are processed in accordance with normal network processes so that the calls can be established. Thus, for example, the system may be configured to allow emergency calls to be placed by UEs in the targeted cell but other UE-originating calls may be prevented.

The blocking of affected UE-originating calls may be performed in various ways. In one example, upon receiving an affected UE originating call when UE-originating calls are being blocked, the relevant access-network node rejects the call, for example by an admission control process in the access network or by spoofing a core network message. In 3G networks a NodeB or RNC may reject the call, in an LTE network the eNodeB rejects the call.

In 3G or 4G networks a first approach using a radio resource control (RRC) procedure consists in an RRC rejection according to a process specified in technical standards TS 25.331/TS.36.331. A second RRC-based approach consists in implementing an RRC disconnection after establishment of an RRC connection, according to a process specified in technical standards TS 25.331/TS.36.331.

In certain embodiments in which the access-network node of a 3G or 4G network spoofs a core network message, there are various different core network messages that may be spoofed. For example, the NodeB, RNC or eNodeB may spoof:
 a packet-switched core/Evolved Packet Core Non-Access Stratum disconnection message,
 a CS Core disconnection message
 an IMS Core disconnection message,
bearing in mind that the above list is not exhaustive.

An advantage of approaches in which the access-network node spoofs a core network message is that the UE attempting to originate a call receives the impression that the network if functioning normally, i.e. the fact that cell-blocking is in operation is more effectively hidden from the user.

Another function that the access-network node may perform while it is in the cell-blocking state is to block UE-terminated calls (i.e. incoming calls directed to UEs in the targeted cell). The blocking of incoming calls may be performed selectively based on access class or establishment cause. Whether or not blocking of incoming calls is performed selectively may be a configurable parameter, as indicated above. In a case where incoming calls are blocked selectively based on access class/establishment cause, incoming calls that are in permitted (unblocked) access classes are processed in accordance with normal network processes so that the calls can be established.

Various techniques may be used for blocking incoming (UE-terminated) calls. One option is for the access-network node to suppress paging messages that would normally be broadcast to a UE when it is being called. The suppression of paging messages may be performed selectively based on access class or establishment cause. Whether or not to suppress paging messages may be a configurable parameter of the cell-blocking system. Another option is for paging messages still to be broadcast but for the incoming call to be rejected in another manner, for example by admission control performed in the access-network, using a spoofed core network message, and so on.

Another function that the access-network node may perform while it is in the cell-blocking state is to prohibit handovers which would handover a call to the cell being blocked. Once again, the prohibition of handovers may be performed selectively based on access class or establishment cause of the call being handed over. Further, whether or not prohibition/disconnection of handovers takes place during the cell-blocking operation of the access-network node, and whether or not the prohibition/disconnection of handovers is performed selectively, may be configurable parameters.

In a case where the access-network node is arranged, when in the cell-blocking state, to prohibit handovers into the cell, upon occurrence of an affected incoming handover while the access-network node is in the cell-blocking state, the access-network node may operate:
 to reject the handover (in the case where affected handovers are prohibited), or
 to immediately disconnect the call upon successful handover (in the case where handovers are not prohibited but disconnection is specified).

The handover may be rejected in any convenient manner, for example by using existing techniques specified in the technical standards applicable to the network in question. The call may be disconnected by any convenient technique, for example: using the call-disconnection techniques mentioned above, by omitting to forward the UE-originating call to the core network, and so on.

In a case where the access-network node is arranged, when in the cell-blocking state, to prohibit or disconnect handovers into the cell selectively based on access class or establishment cause, upon occurrence of an incoming handover while the access-network node is in the cell-blocking state, where handovers are permitted in respect of the associated access class or establishment cause, the access-network node may simply process the handover as normal, i.e. as if cell-blocking were not in operation.

Another function that the access-network node may perform while it is in the cell-blocking state is to broadcast information about the cell-blocking, or continue to broadcast information if an initial broadcast was already made upon activation of the cell-blocking operating mode of the access-network node. The broadcasting of information regarding the cell-blocking while the access-network node remains in the cell-blocking state cell may be a configurable parameter of the cell-blocking functionality.

Figure 3:
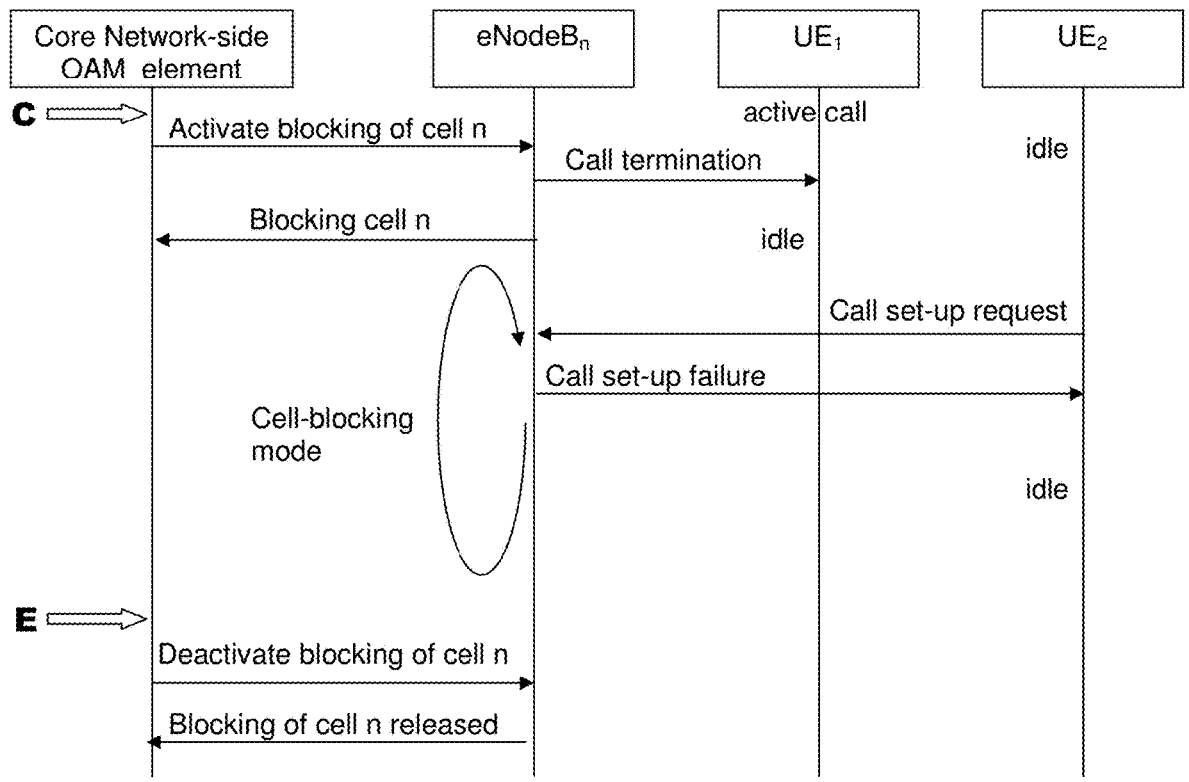
FIG. 3 is a diagram illustrating messages exchanged between network elements during implementation of a cell-blocking method according to an embodiment of the invention.

FIG. 3 is a diagram representing an example of messages that may be exchanged between components of a cellular communications network during implementation of a cell-blocking method such as that of FIG. 2. The example of FIG. 3 relates to a case where the cell-blocking operating mode of an access-network node, eNodeB$_n$, serving a cell n is activated by an OAM element in a core network to perform cell-blocking on cell n, and, at the time of activation of the cell-blocking operating mode, a first UE, UE$_1$, in cell n is involved in an active call whereas a second UE, UE$_2$, in cell n is not involved in an active call.

According to the example of FIG. 3, an input C from the network operator instructs a core-network-side element of the network's OAM system to implement cell-blocking in a set of cells which includes cell n of the network (cell n may be the only cell of the set, or the set may include one, two or more than two other cells). In appropriate cases, the input C may also specify setting for various configurable parameters of the cell-blocking that is to be performed. The core-network-side OAM element activates the cell-blocking operating mode of node eNodeB$_n$, and, in response, eNodeB$_n$ sends an acknowledgement signal back to the core-network-side OAM element to confirm that the cell-blocking operating mode is being activated, and also sends a call termination message to UE$_1$ to disconnect the active call in which UE$_1$ is participating. As discussed above, the call termination message may be an Iu Release Request, an RRC Connection Release, and so on. UE$_1$ ceases to be on an active call and enters an idle state like UE$_2$.

As illustrated in FIG. 3, during a period when eNodeB$_n$ remains in cell-blocking operating mode, UE$_2$ seeks to set up an outgoing call. UE$_2$ sends a call set-up message to eNodeB$_n$ (for example UE$_2$ sends a RRC Connection Request message with a reason MO-data, or an Extended Service Request message with a reason MO-call) but eNodeB$_n$ responds by sending a call set-up failure message to UE$_2$. As discussed above, various different type of message may be sent to UE$_2$ to serve as the call set-up failure message.

In the example of FIG. 3, the network operator provides an input to the OAM system to indicate that cell-blocking in cell n should be brought to an end. The core-network-side OAM deactivates eNodeB$_n$ and eNodeB$_n$ sends an acknowledgement signal to confirm that the cell-blocking operating mode has been deactivated.

Figure 4:
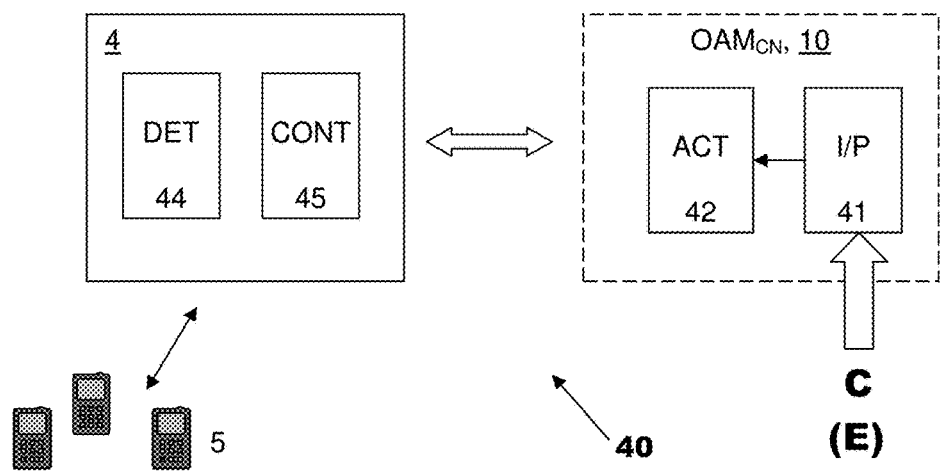
FIG. 4 is a simplified block diagram illustrating components in cell-blocking apparatus according to an embodiment of the invention.

FIG. 4 illustrates schematically certain components in an example cell-blocking apparatus 40 according to an embodiment of the invention. In the example of FIG. 4, access-network nodes 4 of cellular communications network 1 are configured to be operable in a cell-blocking mode to block communications in cells of the communications network, for example as described above. The cell-blocking apparatus 40 includes an input unit 41 for receiving a designation of a set of one or more cells in the network 1 that are to be blocked. An activation unit 42 is also provided, for activating a cell-blocking operating mode of one or more access-network nodes serving the designated set of cells. The activation unit 42 is configured to communicate with access-network nodes so as to implement activation of their cell-blocking operating mode. The input unit 41 and activation unit 42 may be components of an OAM system in the network 1, for example, they may be components of a core-network-side OAM element 10. In this manner it is not necessary to add additional components to the network 1. The activation unit 42 may, for example, communicate with access-network nodes 4 over S1 links in the case of an LTE network, or comparable links in the case of networks based on other technical standards.

The cell-blocking apparatus 40 of FIG. 4 also includes a detection unit 44 in the access-network node 4, to detect calls that are active in the designated cell upon activation of the cell-blocking mode of the access-network node, and a control unit 45 to disconnect active calls detected by the detection unit 44. The control unit 45 may be arranged to disconnect active calls selectively, based on access class or establishment cause associated with the active call, as described above in connection with the cell-blocking method of FIG. 2.

Embodiments of the invention may provide processing apparatus (for example, computer apparatus comprising a processor) to implement the functionality of the input unit 41 and activation unit 42 described above. Likewise, embodiments of the invention provide processing apparatus (for example, computer apparatus comprising a processor) to implement the functionality of the detection unit 44 and control unit 45 described above. In each case the processing apparatus (or processor) may be configured to execute instructions of a computer program to implement the method. The processing apparatus may form part of the network, for example it may be constituted by a node in the network.

Embodiments can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer- or machine-readable medium allowing data, instructions, messages or message packets, and other machine-readable information to be read from the medium. The computer- or machine-readable medium may include non-volatile memory, such as ROM, Flash memory, Disk drive memory, CD-ROM, and other permanent storage. Additionally, a computer- or machine-readable medium may include, for example, volatile storage such as RAM, buffers, cache memory, and network circuits. Furthermore, the computer- or machine readable-medium may comprise computer- or machine-readable information in a transitory state medium such as a network link and/or a network interface, including a wired network or a wireless network, that allow a device to read such computer- or machine-readable information.

The functions performed by the various units of the cell-blocking apparatus 40 illustrated in FIG. 4 may be distributed in a different manner from that illustrated in the figure: for example, the described functions may be distributed over a greater or lesser number of units than the number shown in FIG. 4. Moreover, additional functions may be performed by the above-described units in the cell-blocking apparatus 40, or by additional units that may be provided in the apparatus 40. Thus, for example, the cell-blocking apparatus may be configured to implement one or more of the various processes described above in connection with the cell-blocking method of FIG. 2 (e.g. disconnection/prohibition on handovers, broadcasting of cell-barring information, rejection of calls, transmission of spoofed core network messages, and so on). Operator input E to bring cell-blocking to an end in a specified cell may be input to the input unit 41 or to another unit provided in the cell-blocking apparatus 40.

Although the invention has been described with reference to certain specific embodiments it is to be understood that various modifications and improvements can be made without departing from the scope of the invention as defined in the appended claims.

For example, the description above treats the activation of the cell-blocking operating mode of a given access-network node as synonymous with the blocking of a particular single cell of the cellular network, i.e. implying a one-to-one relationship between access-network nodes and cells. In some situations a one-to-one relationship of this type will exist, but this is not always the case. Some access-network nodes serve two cells, or more than two cells. It is to be understood that in a case where an access-network node serves two cells, or more than two cells, the access-network node may be arranged to implement the above-described cell-blocking functionality for the whole set of cells that it serves, treating them as a group of cells that are either all blocked or all unblocked. Alternatively, the access-network node may be arranged to implement the above-described cell-blocking functionality individually for each of the different cells it serves, so that at a given time a sub-set of the cells may be blocked even while the other cell(s) are unblocked. The list of cells to be blocked at a given time may be a configurable parameter.

In the case of access-network nodes that serve two cells, or more than two cells, the access-network node may be arranged to broadcast information regarding cell-blocking just in the cells it serves that are affected by the cell-blocking.

As another example, in the specific embodiments described above the access-network node is generally an eNodeB of an LTE network. However, in 3G networks such as UMTS networks the access-network nod may be a NodeB or RNC. In the case where an RNC is the radio-access node implementing cell-blocking the RNC may be arranged to implement cell-blocking individually for different cells it serves.

INDUSTRIAL APPLICABILITY

The present invention finds application in cellular communications networks.

The invention claimed is:

1. A cell-blocking method in a cellular communications network comprising an access network, the method comprising: designating a cell in the access network for blocking; activating a cell-blocking operating mode of an access-network node serving the designated cell; detecting, by the access-network node, upon activation of the cell-blocking mode of the access-network node, active calls involving user equipment in the designated cell; disconnecting, by the access-network node, at least one active call among the active calls detected by the detecting; and determining at least one of an access class or an establishment cause associated with each detected active call, wherein the disconnecting of at least one active call comprises disconnecting at least one active call selected among the detected active calls on the basis of the determined at least one of the access class or establishment cause.

2. The cell-blocking method according to claim 1, wherein, while operating in the cell-blocking mode, the access-network node blocks at least one of the incoming calls that are directed to user equipment in the designated cell.

3. The cell-blocking method according to claim 1, wherein the activating of the cell-blocking operating mode of the access-network node is performed by an operation and management system of the cellular communications network.

4. The cell-blocking method according to claim 1, wherein, while operating in the cell-blocking mode, the access-network node blocks at least one of the incoming calls that are directed to user equipment in the designated cell.

5. The cell-blocking method according to claim 4, further comprising determining at least one of an access class or an establishment cause associated with an incoming call directed to user equipment in the designated cell, wherein the blocking of the at least one of the incoming calls by the access-network comprises blocking at least one incoming call selected on the basis of the determined at least one of the access class or establishment cause associated with the incoming call.

6. The cell-blocking method according to claim 5, wherein, while operating in the cell-blocking mode, the access-network node blocks the at least one incoming call to user equipment in the designated cell by omitting to broadcast paging messages to the user equipment.

7. The cell-blocking method according to claim 4, wherein, while operating in the cell-blocking mode, the access-network node blocks the at least one incoming call to user equipment in the designated cell by omitting to broadcast paging messages to the user equipment.

8. The cell-blocking method according to claim 1, further comprising:

detecting, by the access-network node, upon activation of the cell-blocking mode of the access-network node, handovers into the designated cell that are in progress, and terminating, by the access-network node, detected handovers.

9. The cell-blocking method according to claim 8, wherein the access-network node is configured, upon activation of the cell-blocking mode, to terminate at least one of the handovers into the designated cell selectively dependent on the access class or establishment cause associated with the incoming call.

10. The cell-blocking method according to claim 1, further comprising:

receiving, by the access-network node while operating in cell-blocking mode, outgoing call set-up requests from user equipment in the designated cell, and blocking, by the access-network node while operating in cell-blocking mode, at least one outgoing call from user equipment in the designated cell.

11. The cell-blocking method according to claim 10, further comprising determining at least one of an access class or an establishment cause associated with an outgoing call from user equipment in the designated cell, wherein the blocking of the at least one outgoing call by the access-network node comprises blocking at least one outgoing call selected on the basis of the determined at least one of the access class or establishment cause associated with the outgoing call.

12. The cell-blocking method according to claim 11, wherein the blocking of at least one outgoing call from user equipment in the designated cell comprises transmitting a spoofed core network message to the user equipment.

13. The cell-blocking method according to claim 11, wherein the blocking of at least one outgoing call from user equipment in the designated cell comprises rejecting the call using an admission control mechanism in the access network.

14. The cell-blocking method according to claim 10, wherein the blocking of at least one outgoing call from user equipment in the designated cell comprises transmitting a spoofed core network message to the user equipment.

15. The cell-blocking method according to claim 10, wherein the blocking of at least one outgoing call from user equipment in the designated cell comprises rejecting the call using an admission control mechanism in the access network.

16. The cell-blocking method according to claim 1, wherein the activating of the cell-blocking operating mode of the access-network node is performed by an operation and management system of the cellular communications network.

17. A cell-blocking apparatus for a cellular communications network comprising an access network, the cell-blocking apparatus comprising:

at least one processor; and at least one non-transitory computer-readable medium comprising instructions stored thereon which when executed by the at least one processor configure the cell-blocking apparatus to:

receive a designation of a cell in the access network to be blocked;

activate a cell-blocking operating mode of an access-network node serving the designated cell;

detect, in the access-network node, active calls with user equipment in the designated cell upon activation of the cell-blocking mode of the access-network node;

disconnect, in the access-network node, at least one active call among the active calls detected; and determine at least one of an access class or an establishment cause associated with each detected active call, wherein the disconnecting of at least one active call comprises disconnecting at least one active call selected among the detected active calls on the basis of the determined at least one of the access class or establishment cause.

18. The cell-blocking apparatus according to claim 17, wherein the instructions further configure the cell-blocking apparatus to activate a cell-blocking operation mode of at least one of a NodeB, a Radio Network Controller or an eNodeB.

19. The cell-blocking apparatus according to claim 17, comprising an operations and management system of the network, which implements the activation of the cell-blocking operating mode of the access-network node.

* * * * *